(12) United States Patent
Choi et al.

(10) Patent No.: US 11,009,944 B1
(45) Date of Patent: May 18, 2021

(54) SYSTEMS AND METHODS FOR DISPLAYING FOVEATED IMAGES

(71) Applicant: Facebook Technologies, LLC, Menlo Park, CA (US)

(72) Inventors: Min Hyuk Choi, San Jose, CA (US); Cheonhong Kim, Mountain View, CA (US); Youngshik Yoon, Cupertino, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/521,522

(22) Filed: Jul. 24, 2019

(51) Int. Cl.
*G06F 3/01* (2006.01)
*G09G 3/3275* (2016.01)
*G09G 3/3266* (2016.01)
*G09G 3/20* (2006.01)

(52) U.S. Cl.
CPC .......... *G06F 3/013* (2013.01); *G09G 3/2003* (2013.01); *G09G 3/3266* (2013.01); *G09G 3/3275* (2013.01); *G09G 2300/0804* (2013.01); *G09G 2310/0243* (2013.01); *G09G 2310/08* (2013.01); *G09G 2340/0407* (2013.01); *G09G 2354/00* (2013.01)

(58) Field of Classification Search
CPC ....... G06F 3/013; G06F 3/011; G09G 3/3266; G09G 3/2003; G09G 3/3275; G09G 2300/0804; G09G 2310/0243; G09G 2310/08; G09G 2340/0407; G09G 2354/00
See application file for complete search history.

(56) References Cited

U.S. PATENT DOCUMENTS

| 10,248,198 | B1* | 4/2019 | Kim | G06F 1/163 |
|---|---|---|---|---|
| 2009/0040243 | A1* | 2/2009 | Hisada | G09G 3/3648 |
| | | | | 345/690 |
| 2017/0076666 | A1* | 3/2017 | Kawana | G09G 3/3266 |
| 2017/0236466 | A1* | 8/2017 | Spitzer | G09G 3/3275 |
| | | | | 345/560 |
| 2018/0095274 | A1* | 4/2018 | Lee | G09G 3/20 |
| 2018/0164882 | A1* | 6/2018 | Johnson | G06F 3/013 |
| 2019/0164468 | A1* | 5/2019 | Jung | G09G 3/2092 |
| 2019/0355332 | A1* | 11/2019 | Knez | G09G 3/2092 |

* cited by examiner

*Primary Examiner* — Hong Zhou
(74) *Attorney, Agent, or Firm* — Baker Botts L.L.P.

(57) ABSTRACT

In one embodiment, a computing system may determine a first region and a second region of an image based on gaze data of a user. The second region may be displayed with lower image resolution than the first region. The system may access a first pixel value associated with the first region of the image. The system may cause a first source driver circuit of a display to generate a first pixel signal. The first pixel signal may be configured to control a luminance of a first number of pixels. The system may access a second pixel value associated with the second region of the image. The system may cause a second source driver circuit of the display to generate a second pixel signal which may be configured to control a luminance of a second number of pixels. The second number may be larger than the first number.

20 Claims, 15 Drawing Sheets

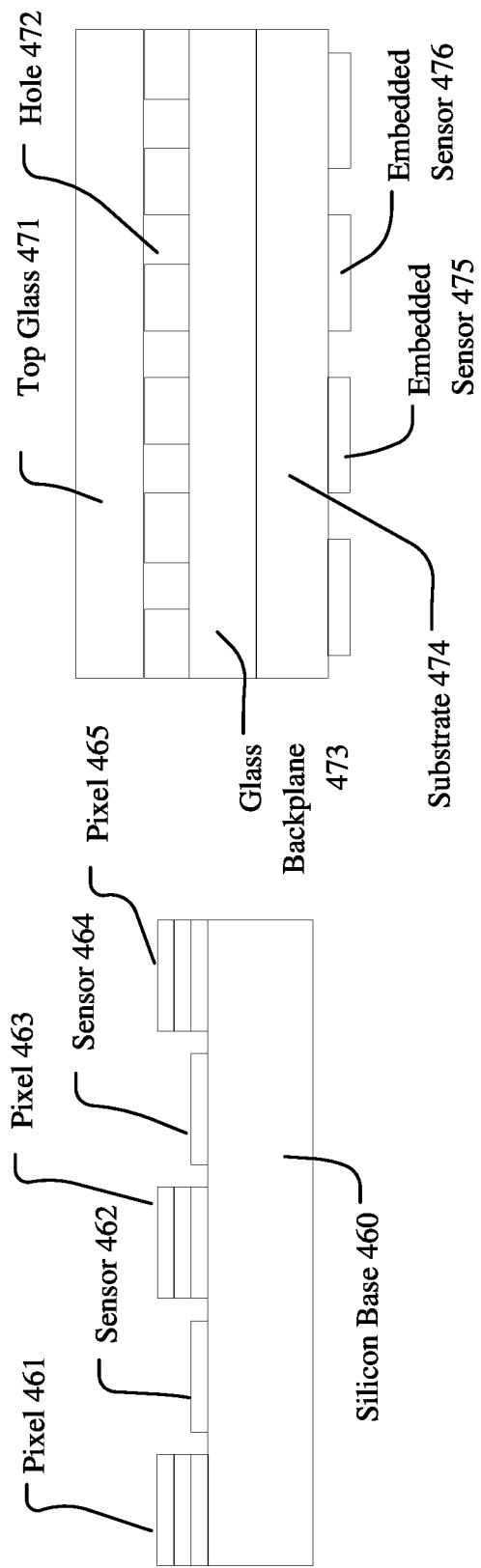

SYSTEMS AND METHODS FOR DISPLAYING FOVEATED IMAGES

TECHNICAL FIELD

This disclosure generally relates to artificial reality, such as virtual reality and augmented reality.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

Particular embodiments described herein relate to systems and methods of using shared driving signals (e.g., gate driver signals or clock signals, source driver signals or pixels signals) to drive multiple pixels (e.g., multiple pixel rows or/and multiple pixel columns) to reduce the power consumption of the display for displaying foveated images (which may have reduced image resolution in at least of portion of the image). The system may use a display engine, an application processor, or a system-on-chip (SoC)) including a graphic pipeline to generate image data and send the generated image data to the display. The display may include a timing controller (T-CON) which may drive (e.g., sending timing signals to) the source driver module and gate driver module of the display. The gate driver module may generate and send a clock signal (e.g., a gate driver signal generated by a gate driver circuit) to one or more rows of pixels to turn on the pixels in those rows. The source driver module may generate and send pixel signals to one or more columns of pixels which are associated with a color channel (e.g., RGB) to set the color values of the pixels during the corresponding turn-on time of the clock signals from the gate driver circuits. The amplitudes of the pixel signals may correspond to color values or grayscale values of the corresponding pixels of the corresponding color channels.

For an image portion having a reduced resolution, some adjacent pixels or neighboring pixels of that image portion may share same color values or grayscale values. The same clock signal sent by the gate driver module may be shared by different pixels having the same color values. For example, instead of sending an independent clock signal to each row of pixels, the display may use a switch to route the same clock signal onto the control lines of two or more rows of pixels which contain the pixels sharing the same grayscale values. The system may simultaneously set the grayscale values of two or more pixels using the shared clock signal, and therefore reduce the number of clock signals needed for displaying the foveate image. Similarly, for the pixel pulse signal generated by the source driver module, instead of sending an independent pixel signal or source driver signal to each pixel column, the display may use a switch to route the same pixel signal or source driver signal onto the control lines of two or more pixel columns (of the same color channel) which contain the pixels sharing the same grayscale values, and therefore reduce the pixel signals or source driver signals needed for displaying foveated images. Furthermore, the display may use clock signals or/and pixel signals with increased pulse width (e.g., N times of normal width) to set the multiple pixels sharing the same color value, and therefore reduce the number of pulses (e.g., the numbers of the source driver signal pulses or/and gate driver clock signal pulses) and the operating frequencies of these signals. With the reduced number of the clock signals, reduced number of pixel signals, or/and increased pulse widths, the AR/VR system could reduce the power consumption of the display system related to the process of displaying foveated images.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIGS. 4A-B illustrate example side views of display with embedded sensors.

DESCRIPTION OF EXAMPLE EMBODIMENTS

AR/VR systems may have limited available power (e.g., powered by battery). However, displaying high resolution display content could be power consuming and have negative impact on the battery life of the AR/VR systems. Particular embodiments may use foveated displaying techniques to reduce the image resolution outside of the user's foveal vision, and consequently reduces the amount of computation and power consumption related to the displaying process. For example, the system may use eye tracking sensors embedded within a display (e.g., sensors embedded in OLED, sensors embedded under transparent portions of AMOLED, etc.) to determine the location and size of the user's foveal region and use such information to selectively reduce the resolution outside of the foveal region. Furthermore, for displaying high resolution display content, the AR/VR systems may need a large number of driving signals (e.g., clock signals or gate driver signals, pixel signals or source driver signals, etc.) operating at high frequencies, and therefore consume much power. Particular embodiments may, in the display regions with reduced resolutions, reduce the number of driving signals that are needed for the displaying process by feeding the same clock signal to multiple pixels (e.g., multiple pixel rows) or/and feeding the same pixel signal to multiple pixels (e.g., multiple pixel columns). The clock signals or/and pixel signals that are shared by multiple pixels may have longer period durations and smaller number of signal pulses in time domain, and consequently lower operating frequencies. As a result, particular embodiments of the system reduce power consumption and, and improve the efficiency of the AR/VR systems for the displaying process.

Figure 1A:
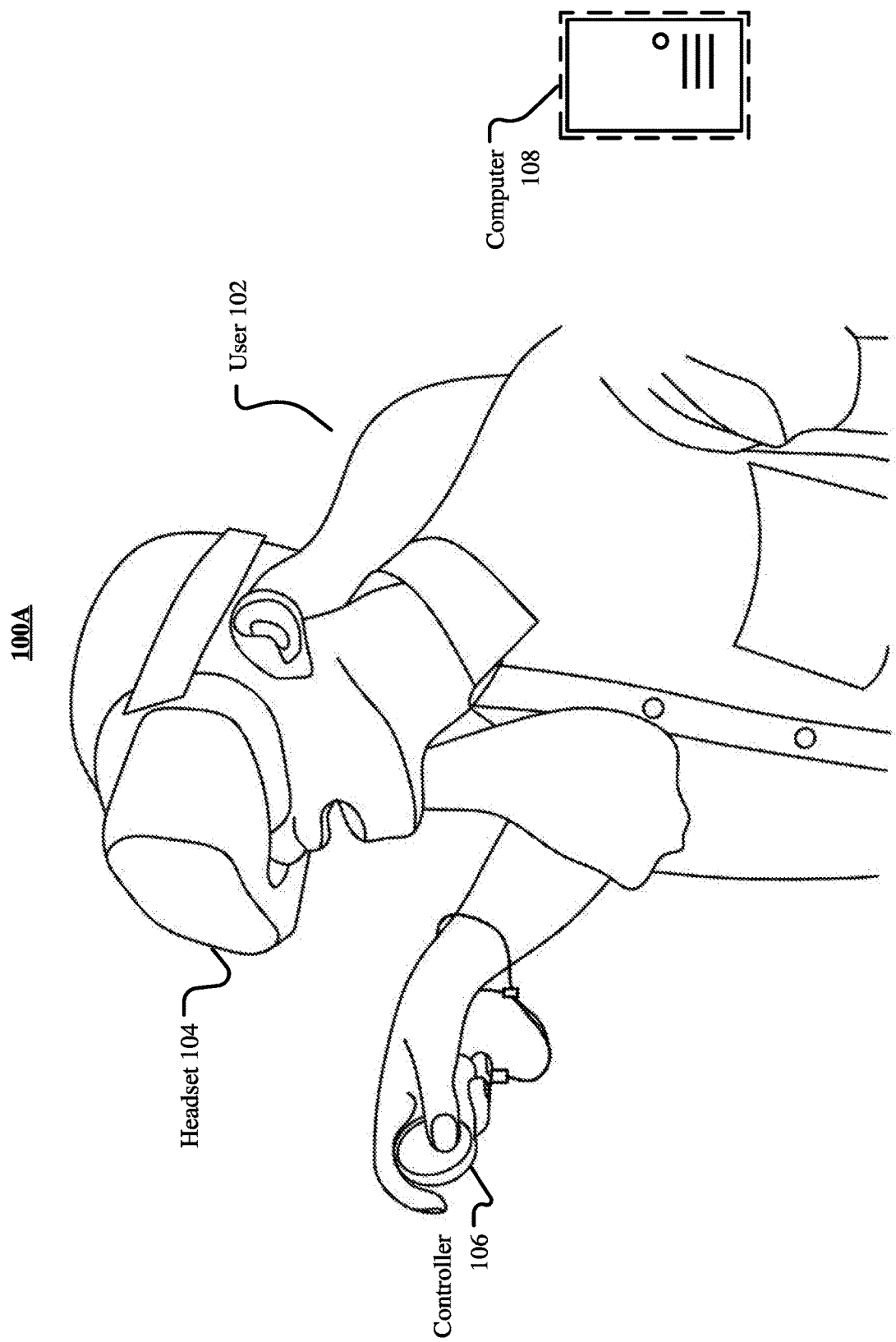
FIG. 1A illustrates an example artificial reality system.

FIG. 1A illustrates an example artificial reality system 100A. In particular embodiments, the artificial reality system 100A may comprise a headset 104, a controller 106, and a computing system 108, etc. A user 102 may wear the headset 104 that could display visual artificial reality content to the user 102. The headset 104 may include an audio device that could provide audio artificial reality content to the user 102. The headset 104 may include one or more cameras which can capture images and videos of environments. The headset 104 may include an eye tracking system to determine the vergence distance of the user 102. The headset 104 may be referred as a head-mounted display (HDM). The controller 106 may comprise a trackpad and one or more buttons. The controller 106 may receive inputs from the user 102 and relay the inputs to the computing system 108. The controller 106 may also provide haptic feedback to the user 102. The computing system 108 may be connected to the headset 104 and the controller 106 through cables or wireless connections. The computing system 108 may control the headset 104 and the controller 106 to provide the artificial reality content to and receive inputs from the user 102. The computing system 108 may be a standalone host computer system, an on-board computer system integrated with the headset 104, a mobile device, or any other hardware platform capable of providing artificial reality content to and receiving inputs from the user 102.

Figure 1B:
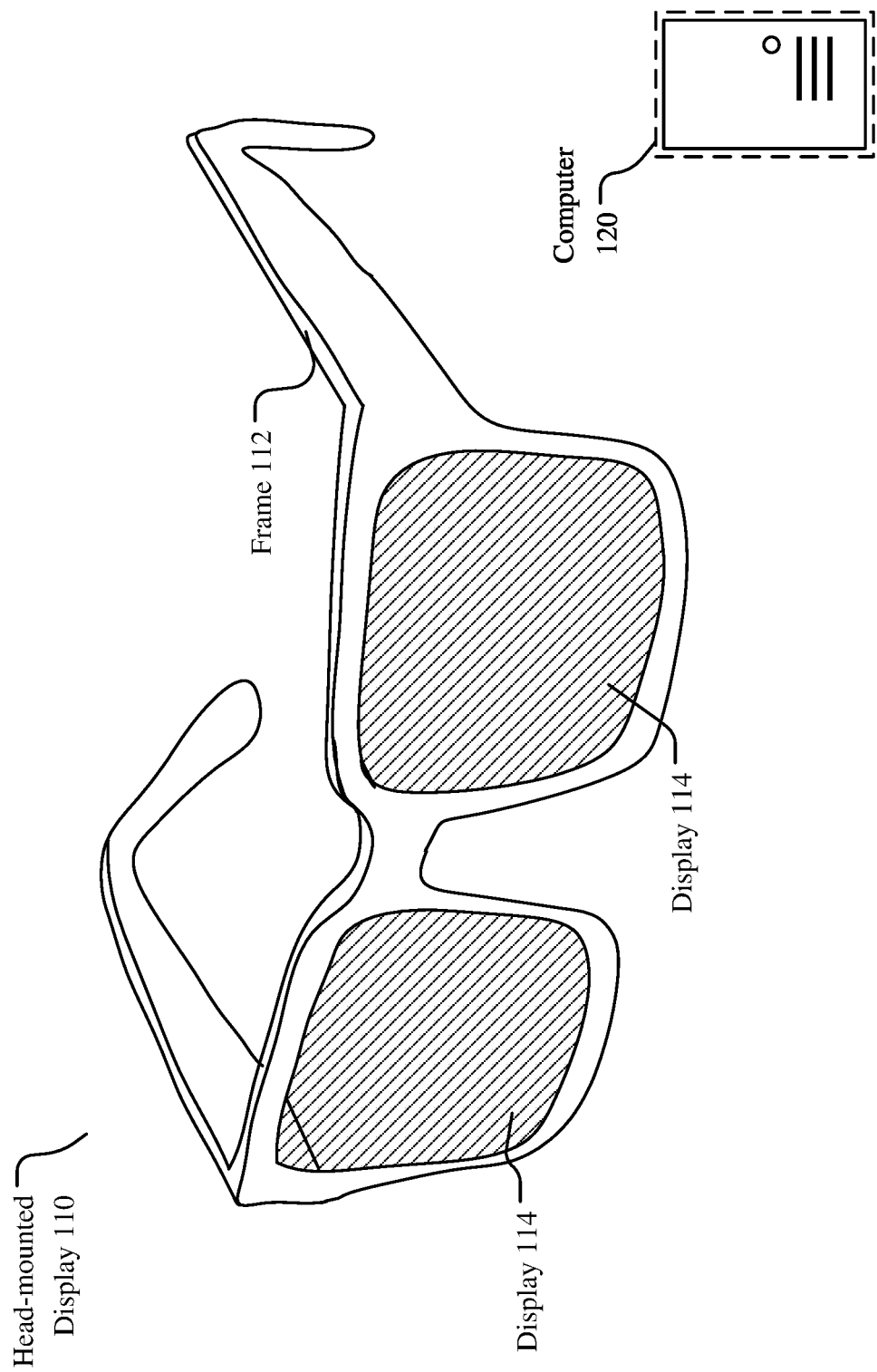
FIG. 1B illustrates an example augmented reality system.

FIG. 1B illustrates an example augmented reality system 100B. The augmented reality system 100B may include a head-mounted display (HMD) 110 (e.g., glasses) comprising a frame 112, one or more displays 114, and a computing system 120. The displays 114 may be transparent or translucent allowing a user wearing the HMD 110 to look through the displays 114 to see the real world and displaying visual artificial reality content to the user at the same time. The HMD 110 may include an audio device that may provide audio artificial reality content to users. The HMD 110 may include one or more cameras which can capture images and videos of environments. The HMD 110 may include an eye tracking system to track the vergence movement of the user wearing the HMD 110. The augmented reality system 100B may further include a controller comprising a trackpad and one or more buttons. The controller may receive inputs from users and relay the inputs to the computing system 120. The controller may also provide haptic feedback to users. The computing system 120 may be connected to the HMD 110 and the controller through cables or wireless connections. The computing system 120 may control the HMD 110 and the controller to provide the augmented reality content to and receive inputs from users. The computing system 120 may be a standalone host computer system, an on-board computer system integrated with the HMD 110, a mobile device, or any other hardware platform capable of providing artificial reality content to and receiving inputs from users.

Figure 2:
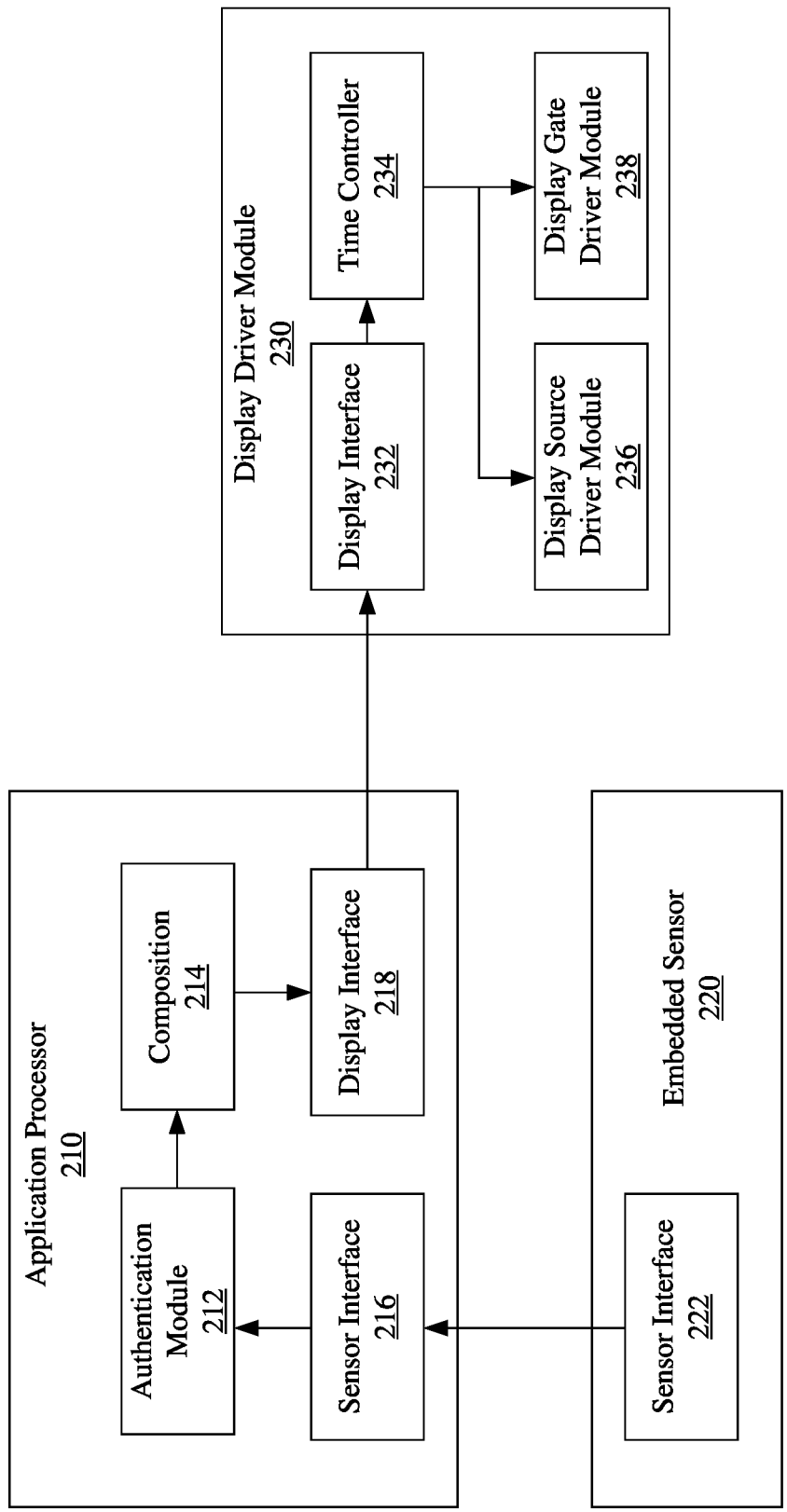
FIG. 2 illustrates an example display driving architecture of the AR/VR system.

FIG. 2 illustrates an example display driving architecture 200 of the AR/VR system. In particular embodiments, the display driving architecture 200 may include an application processor (AP) 210, embedded sensors 220, and a display driver module 230. In particular embodiments, the AP 210 may be or include a system-on-chip (SoC) module including, for example, an authentication module 212, a composition module 214, a sensor interface 216, a display interface 218, etc. The AP 210 may communicate with the embedded sensors 220 through the sensor interface 216 of the AP 210 and the sensor interface 222 of the embedded sensors 220. For example, the embedded sensors 220 may be eye tracking sensors. The authentication module 212 of the AP 210 may receive the eye tracking data (e.g., coordinate data of authentication eye location) and display areas from the embedded sensor 220 through the sensor interfaces 216 and 222. In particular embodiments, the AP 210 may use a graphic pipeline to generate/render a series of images to be displayed. The composition module 214 may composite the display content data based on the images generated by the graphic pipeline and authentication data received from the authentication module 212. After that, the AP 210 may send the display content data to the display driver module 230 through the display interface 218 of the AP 210 and the display interface 232 of the display driver module 230. The display driver module 230 may use the time controller (T-CON) 234 to coordinate the display source driver module 236 and the display gate driver module 238 to display the received display content. The display source driver module 236 may include a number of source driver circuits (not shown) for generating pixel pulse signals or source driver signals. Each pixel pulse signal or source driver signal may include a number of pulses in the time domain with the pulse amplitudes corresponding to the grayscale values of corresponding pixels. The display gate driver module 238 may include a number of gate driver circuits (not shown) for generating clock signals or gate driver signals. Each clock signal or gate driver signal may include a number of pulses in the time domain with the time period of the pulses corresponding to "turn-on" time of corresponding pixels. In other words, the pixels may receive the grayscale values as set by the amplitudes of the corresponding source driver signal pulses during the pixel pulse time periods.

Figure 3A:
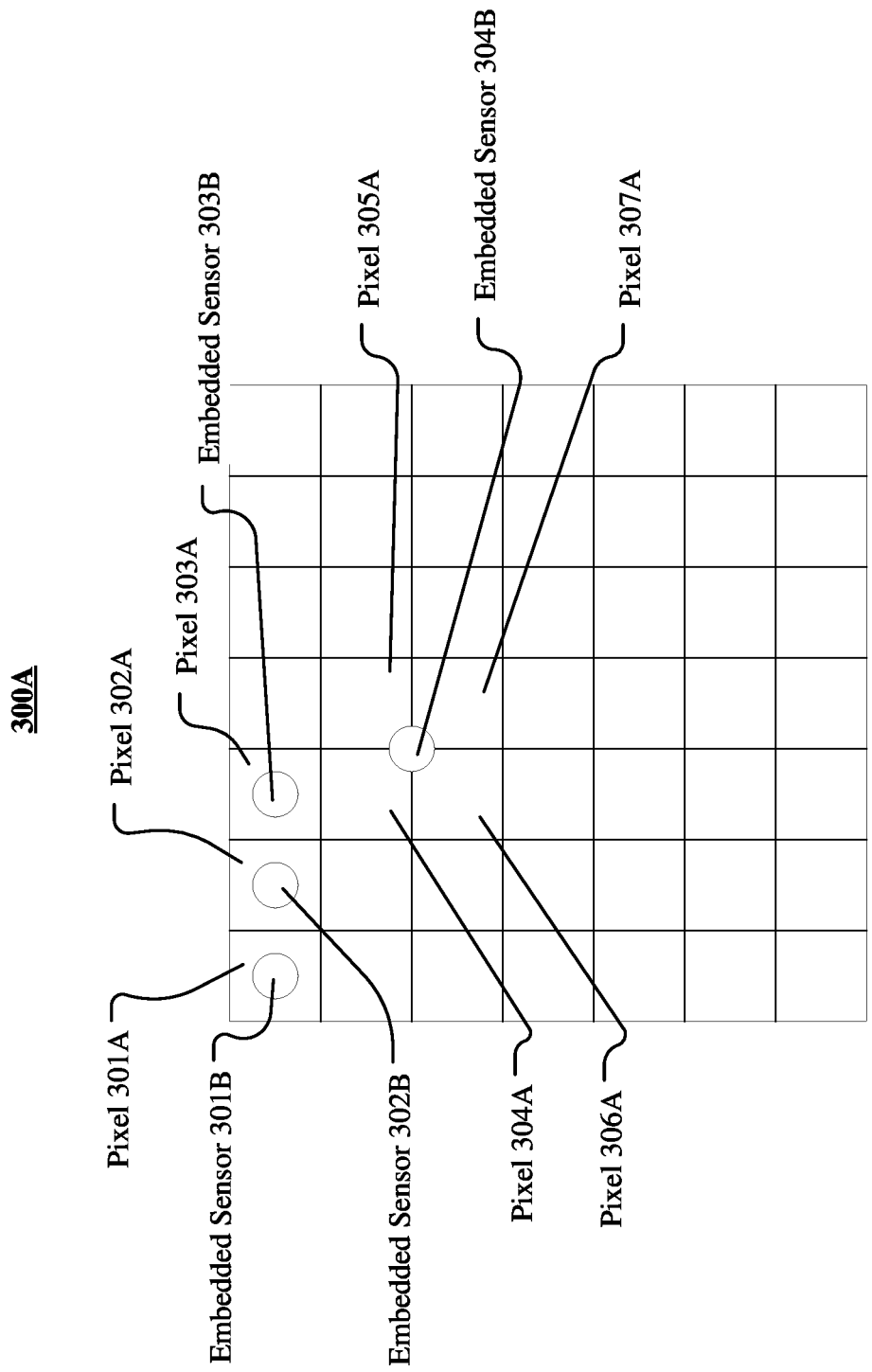
FIGS. 3A-C illustrate example top views of displays with embedded sensors.
Figure 3B:
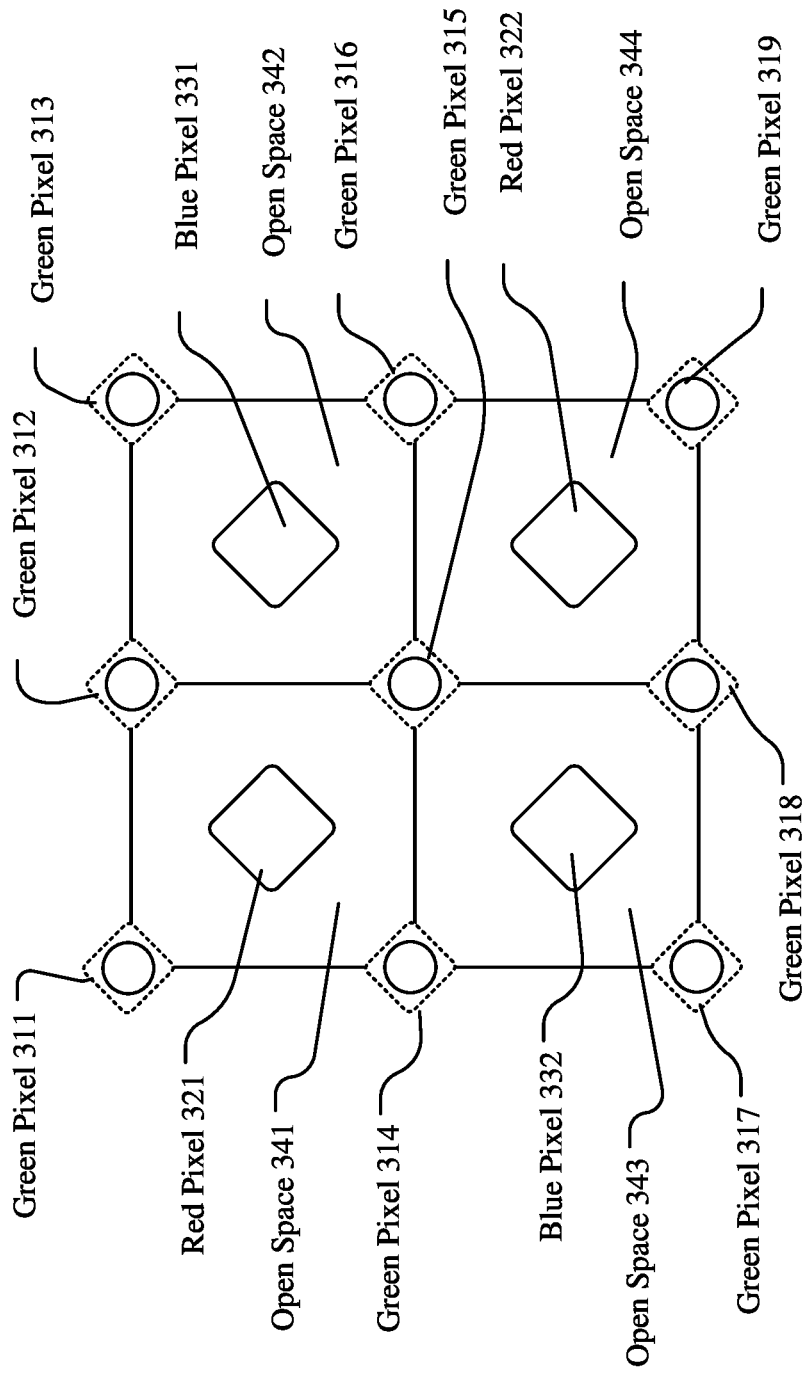
Figure 3C:
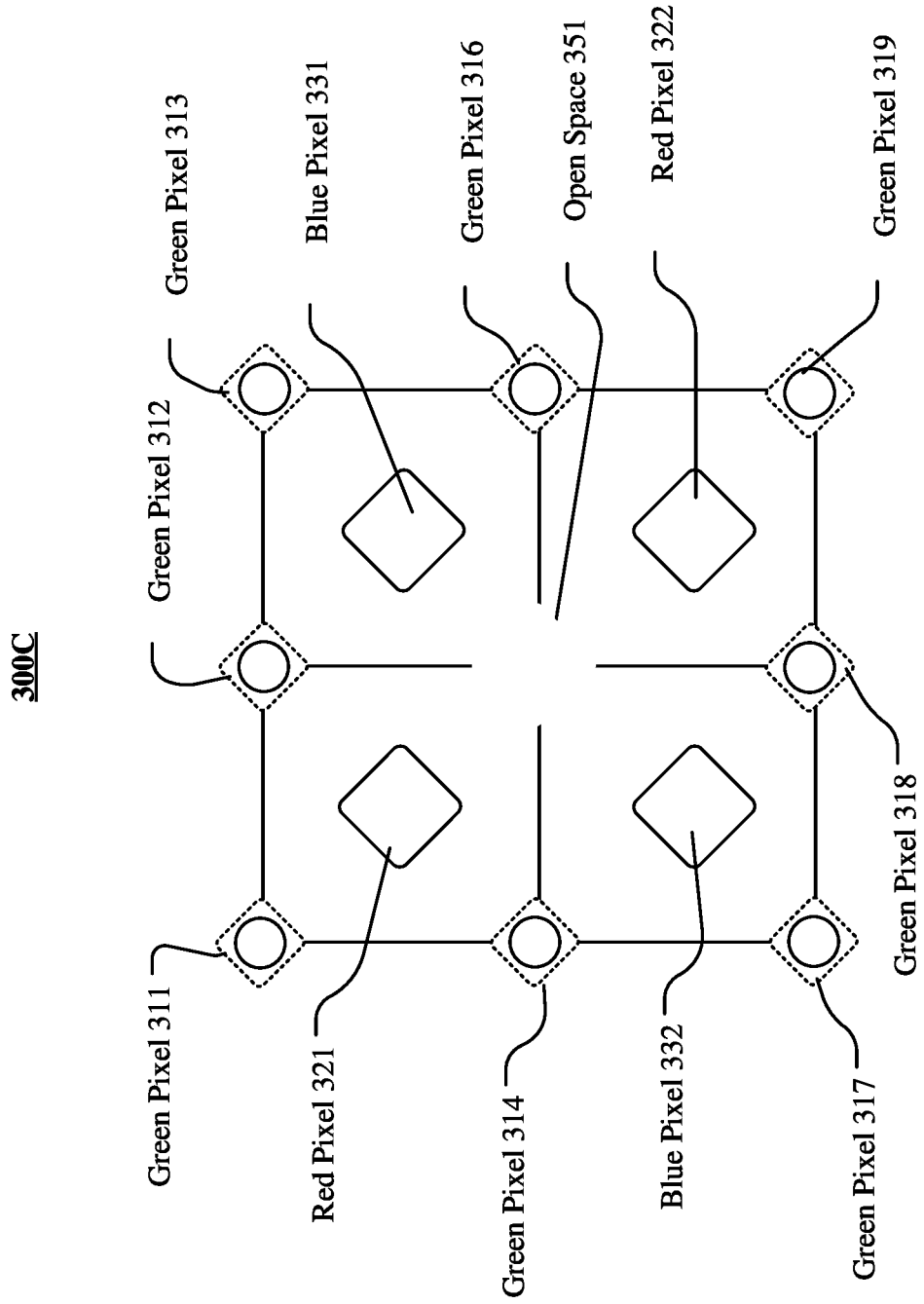

FIGS. 3A-3C illustrate example top views (e.g., 300A-C) of display with embedded sensors. In particular embodiments, the display of the AR/VR system may be, for example, but is not limited to, light-emitting diode (LED) displays, organic light-emitting diode (OLED) displays, active matrix organic light-emitting diode (AMLED) displays, liquid crystal display (LCD), micro light-emitting diode (pLED) display, electrolumninescent displays (ELDs), or any suitable displays. FIG. 3A illustrates example positions for embedding sensors within an array of pixels of a display 300A. The display 300A may include a matrix of pixels (e.g., 301A, 302A, 303A, etc.). In particular embodiments, the embedded sensors may be located at positions corresponding to respective pixels. For example, the embedded sensors 301B, 302B, and 303B may be located at positions corresponding to the pixels 301A, 302A, and 303A, respectively. In particular embodiments, the embedded sensors may be located at positions between multiple pixels. For example, the embedded sensor 304B may be located at a position between the pixels 304A, 305A, 306A, and 307A. It is notable that the embedded sensor positions as described here are for example purpose only and embedded sensors are not limited thereof. The embedded sensors could be located at any suitable positions. For example, an embedded sensor may be located at a position between two adjacent pixels. As another example, an embedded sensor may be located at a position corresponding to a center point or an off-center point of a pixel.

FIG. 3B illustrates an example OLED display 300B with transparent areas. In particular embodiments, the embedded sensors may be embedded in the display at locations corresponding to the transparent areas of the display. As an example and not by way of limitation, the OLED display 300B may include a matrix of green pixels (e.g., 311, 312, 313, 314, 315, 316, 317, 318, 319), a matrix of red pixels (e.g., 321, 322), a matrix of blue pixels (e.g., 331, 332), etc. The OLED display may have a larger number of green pixels than the red pixels or blue pixels while the red and blues pixels may have greater size than the green pixels. Each red pixel (e.g., 321, 322) and each blue pixel (e.g., 331, 332) may be surrounded by four respective green pixels. For example, the red pixel 321 may be surrounded by the green pixels of 311, 312, 314, and 315 and the blue pixel 331 may be surrounded by the green pixels of 312, 313, 315, and 316. In particular embodiments, the embedded sensors may be embedded at positions corresponding to the transparent areas (e.g., 341, 342, 343, 344) between the red or blue pixels (e.g., red pixels or blue pixels) and the green pixels surrounding them. It is notable that the transparent areas as described here are for example purpose only and the positions of the embedded sensors are not limited thereof. The embedded sensor can be located at any suitable positions corresponding to any suitable transparent areas. FIG. 3C illustrates an example OLED display 300C with open pixel spaces for embedding sensors. In particular embodiments, the OLED display may include open spaces corresponding respective pixel spaces and the embedded sensors may be located at the positions corresponding to these open spaces. As an example and not by way of limitation, the OLED display 300C may include an open space 351 corresponding to a pixel space. One or more embedded sensors may be located at positions corresponding the open space 351. It is notable that the open space as described here is for example purpose only and the positions of the embedded sensors are not limited thereof. The embedded sensor can be located at any suitable positions corresponding to any suitable open spaces.

FIGS. 4A-B illustrate example side views of displays (e.g., 400A-B) with embedded sensors. FIG. 4A illustrates an example side view of display 400A for embedding sensors between pixels of the display. In particular embodiments, the display may include a matrix of pixels (e.g., 461, 463, 465) on a silicon base 460. The embedded sensors (e.g., 462, 464) may be positioned on the silicon base 460 at the spaces between the pixels (e.g., 461, 463, 465). FIG. 4B illustrates an example top view of display 400B for embedding sensors under the glass backplane of the display. In particular embodiments, the display may include a top glass layer 471, a glass backplane 473 with a number of holes or patterns 472, a substrate 474, etc. The embedded sensors (e.g., 475, 476) may be located at the bottom of the substrate 474 (e.g., polyimide), which could be transparent or semi-transparent to allow lights or/and other sensing signals to pass through to reach the embedded sensors.

Figure 5A:
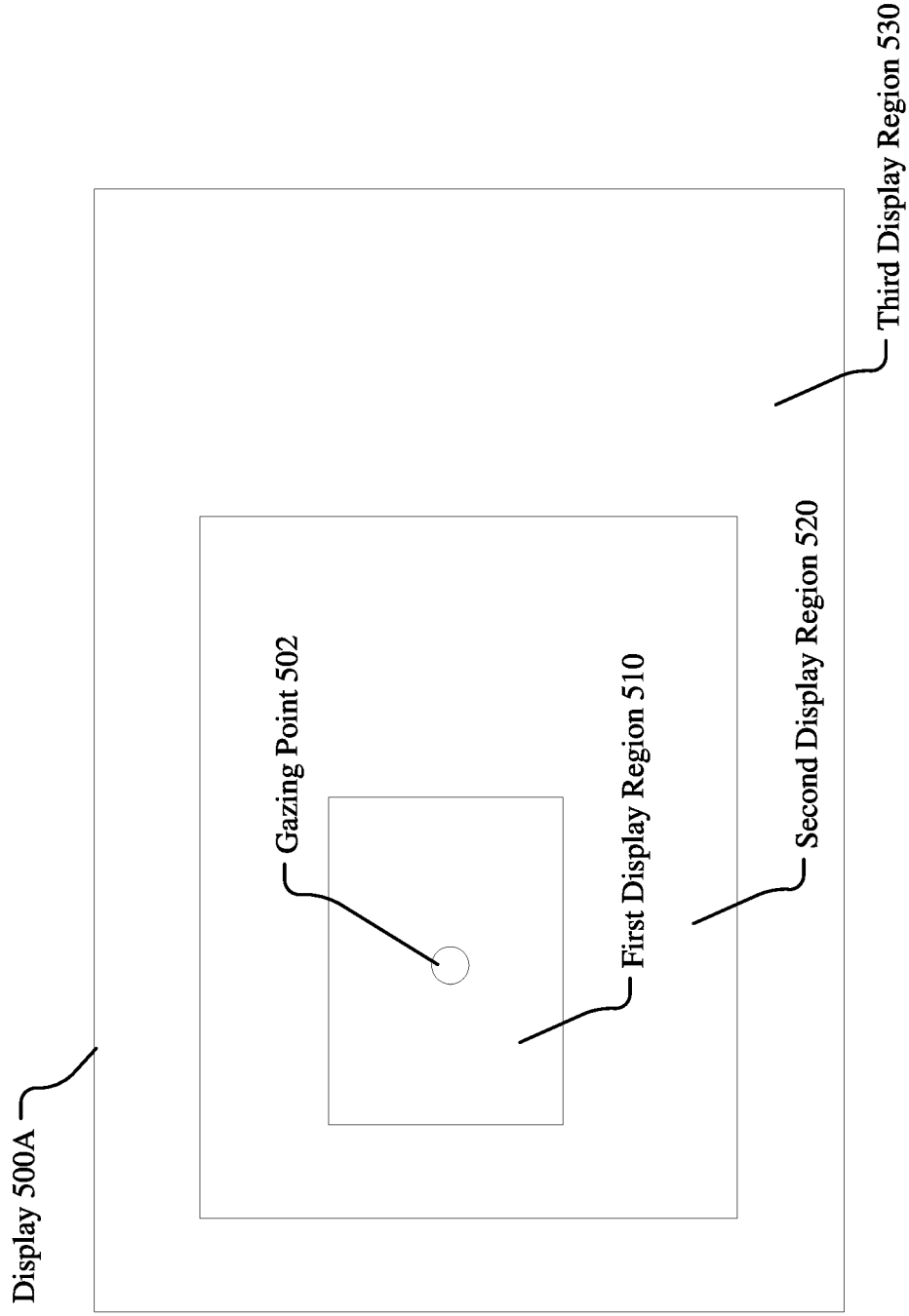
FIG. 5A illustrates an example scheme for foveated display regions.

FIG. 5A illustrates an example scheme 500A for foveated display regions (e.g., 510, 520, 530). In particular embodiments, the system may divide the full display area 501 into different display regions based on the gazing point or eye position of the user. The system may generate a foveated image which may have different resolutions in different image portions or regions corresponding to the foveated display regions. As an example and not by way of limitation, the system may determine a first display region 510 based on the user gazing point 502, which could be determined based on the eye positions of the user as measured by one or more embedded sensors. The first display region 510 may be rectangular area centered at the gazing point 502 covering a portion (e.g., 10%, 20%, 25%, 30%, 50%, 60%, or any suitable percentage) of the full display area 501. It is notable that the shape and size of the first display region 510 as described here are for example purpose only and the first display region 510 is not limited thereof. For example, the first display region 510 could be any suitable shapes (e.g., rectangular shape, square shape, round shape, polygon shape, customized shape, irregular shape, etc.) with any suitable sizes (e.g., any percentage of the full display area). It is notable that the first display region 520 may not need to be centered at the gazing point 502. The gazing point 502 may be located at any suitable positions (e.g., a center-position, non-center positions, positions left to the center, positions right to the center, positions up to the center, positions below the center, arbitrary positions, etc.) in the first display region 520.

In particular embodiments, the system may determine a second display region 520 excluding the first display region 510. The second display region 520 may cover a subset of pixels which may not have shared pixels with the subset of pixels covered by the first display region 510. In particular embodiments, the second display region 520 may be centered at the first display region 510 or/and the gazing point 502. It is notable that the shape and size of the second display region 520 as described here are for example purpose only and the second display region 520 is not limited thereof. For example, the second display region could be any suitable shapes (e.g., rectangular shape, square shape, round shape, polygon shape, customized shape, irregular shape, etc.) with any suitable sizes (e.g., any percentage of the full display area). It is notable that the second display region 520 may not need to be centered at the first display region 510. The first display region 510 may be located at any suitable positions in the second display region 520. In particular embodiments, the system may determine a third display region 530 excluding the first display region 510 and the second display region 520 (e.g., covering a subset of pixels which may not have shared pixels with the subset of pixels covered by the first display region 510 and the second display region 520). In particular embodiments, the third display region 530 may cover the remaining pixels of the display that are not covered by the first display region 510 and the second display region 520. It is notable that the shape and size of the third display region 530 as described here are for example purpose only and the third display region 530 is not limited thereof. For example, the third display region 530 could be any suitable shapes (e.g., rectangular shape, square shape, round shape, polygon shape, customized shape, irregular shape, etc.) with any suitable sizes (e.g., any percentage of the full display area). It is notable that the second display region 520 may be located at any suitable positions in the third display region 530. It is notable that the first, second and third display regions are for example purpose only and the display region division is not limited thereof. The system may divide the display into any number of regions in any suitable manners (e.g., regions divided by a grid pattern, co-centered regions, exclusive regions defined by overlapping shapes, etc.).

In particular embodiments, the system may generate (e.g., using a graphic pipeline) a foveated image with different image resolutions in different image regions (or portions) corresponding to the foveated display regions of the display. The system may display different image portions with different resolutions in different display regions. The system may display image portion with a higher resolution in a display region closer to the gazing point and display image portions with a gradually lower resolution in display regions that are farer from the gazing point. As an example and not by way of limitation, the system may display image portions with a first resolution, a second resolution, and a third resolution in the first display region 510, the second display region 520, and the third display region 530, respectively. The first resolution may be a high resolution (e.g., a full resolution of the display) and the second and third resolution may be reduced resolutions lower than the first resolution. In particular embodiments, the third resolution may be lower than the second resolution and the second resolution may be lower than the first resolution. By using the reduced resolutions in one or more display regions, the system may reduce the amount of computation and power consumption related to the process for generating and displaying the foveated images. In particular embodiments, the foveated images may be subframe images generated based on a mainframe image and a viewpoint or view angle of the user as measured by one or more eye tracking sensors. The mainframe image may be generated from a particular view angle of the user at a mainframe rate of 30-90 Hz and the subframe images may be generated at a subframe rate of 1-2 kHz based on the mainframe image. The foveated subframe image may generated using a graphic pipeline or one or more localized operations (e.g., 2D shifting, interpolation, compositing multiple surfaces into a single surface, etc.).

Figure 5B:
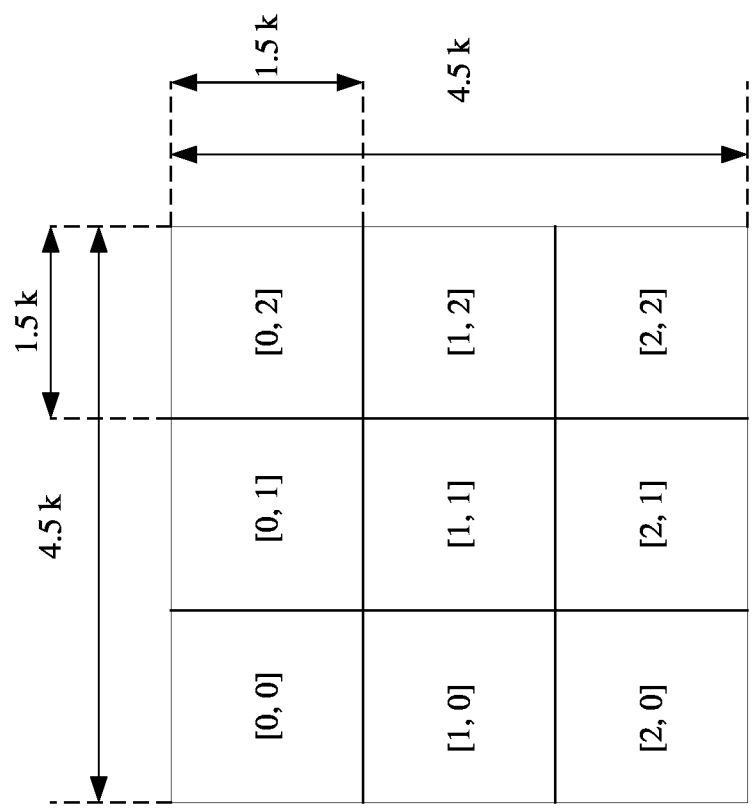
FIG. 5B illustrates an example scheme for foveated display regions divided by a grid pattern.

FIG. 5B illustrates an example scheme 500B for foveated display regions divided by a grid pattern. In particular embodiments, the system may divide the display into a number of display regions using a grid pattern and display image portions with different resolutions in different display regions based on their relative positions or/and distances to the gazing point of the user. As an example and not by way of limitation, the display may have a full resolution of 4.5 k pixels by 4.5 k pixels which may be divided into nine sub-sections (e.g., sub-sections of [0, 0], [0, 1], [0, 2], [1, 0], [1, 1], [1, 2], [2, 0], [2, 1], [2, 2]) with each sub-section containing 1.5 k pixels by 1.5 k pixels. When the gazing point of the user falls within a display region, the system may display an image portion with a higher resolution in that region and display image portions with reduced resolutions in other display regions based on their relative positions or/and distances to the gazing point. For example, when the gazing point falls within the sub-section [1, 1], the system may display an image portion with a higher resolution (e.g., full resolution of the display) in the sub-section [1, 1] and display image portions with lower resolutions in other sub-sections (e.g., sub-sections of [0, 0], [0, 1], [0, 2], [1, 0], [1, 2], [2, 0], [2, 1], [2, 2]). As another example, when the gazing point of the user falls within the sub-section [0, 0], the system may display a first image portion with a first resolution in the sub-section [0, 0], and display a second image portion with a second resolution lower than the first resolution in the sub-sections of [0, 1], [1, 0], and [1, 1]. The system may display a third image portion with a third resolution lower than the second resolution in other subsections (e.g., sub-sections [2, 0], [2, 1], [2, 2], [0, 2], [1, 2]). As another example, when the gazing point falls within the sub-section [1, 0], the system may display a first image portion with a first resolution within the sub-section [1, 0] and display a second image portion with a second resolution lower than the first resolution in the sub-sections [0, 0], [0, 1], [1, 1], [2, 1], and [2, 0]. The system may display a third image portion with a third resolution lower than the second resolution in other sub-sections (e.g., [0, 2], [1, 2], [2, 2]). It is notable than the display regions and resolutions as described here are for example purpose only and are not limited thereof. The system may use any suitable display regions with any suitable resolutions for displaying foveated images. As long as the system displays image with reduced resolution in at least one image portion or region, the system may reduce the amount of computation and power consumption related to the process of displaying foveated images.

Figure 6A:
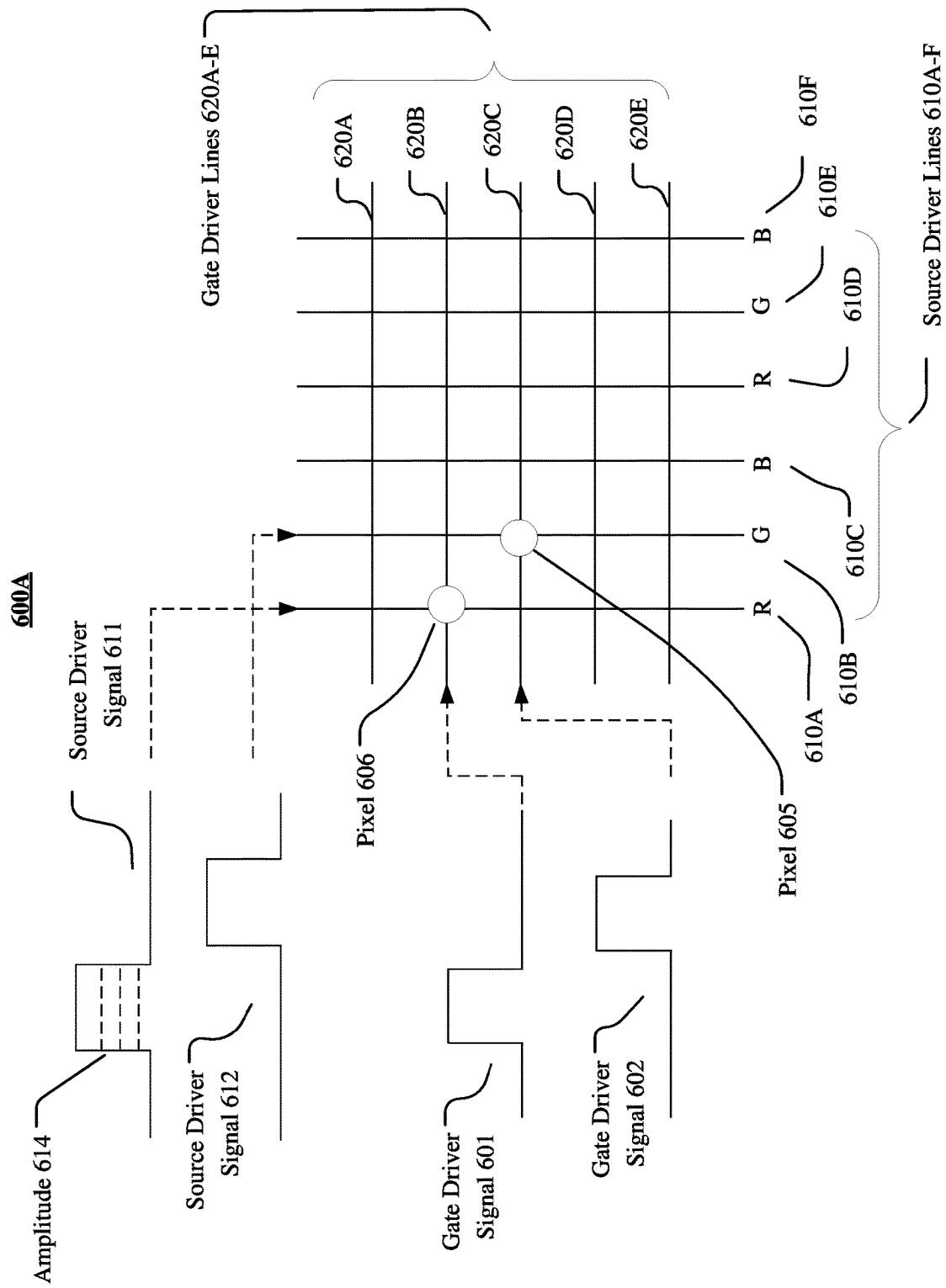
FIG. 6A illustrates an example scheme for displaying an image portion with a full resolution.

FIG. 6A illustrates an example scheme 600A for displaying an image portion with a full resolution. In particular embodiments, the display may include a matrix of pixels corresponding to the display resolution (e.g., 4.5 k pixels by 4.5 k pixels, 4 k pixels by 4 k pixels, 3840 pixels by 2160 pixels, 1920 pixels by 1080 pixels, etc.). The display may include a number of source driver lines (e.g., 610A-F) or control lines and a number of gate driver lines (e.g., 620A-E) for driving the pixel matrix of the display. Each source driver line (e.g., 610A-F) may be connected to a column of pixels of a certain color channel (e.g., Red, Green, Blue). For example, source driver line 610A-C may be connected to column of pixels of the color channels of Red, Green, and Blue, respectively. Each gate driver line (e.g., 620A-E) may be connected to a row of pixels. Each intersection of the gate driver line and the source driver line (e.g., 610A-620B, 610A-630B) may correspond to a pixel (e.g., pixel 606, 607) of a certain color channel (e.g., Red, Green, Blue) of the display.

In particular embodiments, the gate driver lines 620A-E may be connected to a number of gate driver circuits (not shown) included in the gate driver module (e.g., display gate driver module 238 in FIG. 2) of the system. The gate driver circuits may generate the gate driver signals (or clock signals) and send the gate driver signals to corresponding pixel rows through the respective gate driver lines. A gate driver signal (e.g., 601, 602) may include a number of pulses (e.g., voltage pulses) in the time domain. The gate driver line (e.g., 620B) transmitting the gate driver signal may be in HIGH state (e.g., high voltage state) during the pulse periods of the gate driver signal and may be in LOW state (e.g., low voltage state) during the time periods beyond the pulse time periods. When the gate driver signal line (e.g., 620A-E) is in HIGH state, the corresponding row of pixels may be set to respective grayscale values as controlled by corresponding source driver signals (or pixel pulse signals).

In particular embodiments, the source driver lines 610A-F may be connected to a number of source driver circuits (not shown) included in the source driver module (e.g., display source driver module 236 in FIG. 2) of the system. The source driver circuits may generate source driver signals (or pixel pulse signals) and send the source driver signals to corresponding pixels through the respective source driver lines (e.g., 610A-F). A source driver signal (e.g., 611, 612) may include a number of pulses (e.g., voltage pulses) in time domain and may be sent to a column of pixels of a particular color channel through a source driver line (e.g., 610A-F). Each source driver line may connect to a column of pixels of a particular color channel. For example, the source driver lines 610A-C may be connected to pixel columns corresponding to the Red, Green, and Blue color channels, respectively. Similarly, the source driver lines 610D-F may be connected to pixel columns corresponding to the Red, Green, and Blue color channels, respectively. In particular embodiments, the amplitudes of the pulses of the source driver signals may correspond to grayscale values of corresponding pixels. For example, the pulse amplitude 614 (e.g., voltage value) of a source driver signal 611 may correspond to a grayscale value of a corresponding pixel of a Red color channel. A higher pulse amplitude value may correspond to a larger grayscale value of the corresponding pixel. The corresponding pixel (of that color channel) may be set to the grayscale value corresponding to the source driver signal pulse amplitude during the time period of the corresponding gate driver source signal pulse.

In particular embodiments, the system may send the source driver signals with desired pulse amplitudes to respective pixel columns and the gate driver signals to respective pixels rows to set the grayscale values of the pixels. As an example and not by way of limitation, to set the grayscale value of a target pixel 606 of the RED color channel, the system may send a source driver signal 611 with a desired pulse amplitude to the pixel column including the target pixel 606 through the source driver line 610A and send a gate driver signal 601 to the pixel row including the target pixel 606 through the gate driver line 620B. The timing of the source driver signal 611 and the gate driver signal 601 may be coordinated to allow the corresponding source driver signal pulse and gate driver signal pulse to be appropriately arranged in time domain. The target pixel 606 may be set to the grayscale value as determined by the amplitude value of the source driver signal 611 during the time period of the gate driver signal pulse of the gate driver signal 601.

As another example and not by way of limitation, to set the grayscale value of a target pixel 605 of the Green color channel, the system may send a source driver signal 612 with a desired pulse amplitude to the pixel column including the target pixel 605 through the source driver line 610B and send a gate driver signal 602 to the pixel row including the target pixel 605 through the gate driver line 620C. The timing of the source driver signal 612 and the gate driver signal 602 may be coordinated to allow the corresponding source driver signal pulse and gate driver signal pulse to be appropriately arranged in time domain. The target pixel 605 may be set to the grayscale value as determined by the amplitude value of the source driver signal 612 during the time period of the gate driver signal pulse of the gate driver signal 602.

It is notable that the source driver signals and the gate driver signals as illustrated in FIG. 6A are for example purpose only and are not limited thereof. The signal pulses of different source driver signals may be totally-overlapping, partially-overlapping, or non-overlapping in the time domain. The signal pulses of different gate driver signals may have any suitable duration or/and any suitable time interval. In particular embodiments, the system may simultaneously set the grayscale values for multiple pixels in a row of pixels by sending pulses of respective source driver signals to respective pixel columns simultaneously or essentially at the same time and sending a gate driver signal pulse to that pixel row.

In particular embodiments, to display image portion with full resolution of the display, the system may need to set the grayscale value of each pixel of the display region independently. Consequently, the system may need to send a source driver signal to each pixel column and send a gate driver signal to each pixel row. For example, to set the grayscale value of each pixel in the pixel matrix as illustrated in FIG. 6A, the system may need to send a source driver signal to each pixel column of 610A-F (e.g., source driver signal 611 to pixel column 610A, source driver signal 612 to pixel column 610B, etc.) and send a gate driver signal to each pixel row of 620A-E (e.g., gate driver signal 601 to pixel row 620B, gate driver signal 602 to pixel row 620C, etc.). As a result, if the system displays an image with a full resolution for the whole display area of the display (e.g., full display area of the display), the system may need a large number of gate driver signals and source driving signals. For example, for a display with full resolution of 4.5 k pixels by 4.5 k pixels, the system may need to generate and send 4.5 k source driver signals and 4.5 k gate driver signals to set the grayscale value of each pixel of the display for full resolution displaying. Generating large number of gate driver signals and source driver signals may need much computational resources and consume large amount of power.

Furthermore, the system may need to display images at a high frame rate of 1-2 kHz. To set grayscale values for large number of pixels at a speed corresponding to a frame rate (e.g., 1-2 kHz), the grayscale value of each pixel may need to be set within a very short time period. Consequently, the gate driver signals and source driver signals may need to have very short pulse duration (and therefore very high frequencies). However, it could be very power consuming to generate larger number of driving signals with high frequencies. Therefore, the high frequency gate driver signals and source driver signals may further increase the power consumption related to the driver signal generating process. In particular embodiments, the system may display an image portion with a high resolution (e.g., a full resolution of the display) in a foveal display region corresponding to the gazing point of the user and display image portions with reduced resolutions in other display regions. By displaying image portions with reduced resolutions in one or more display regions, the system may need less driving signals (e.g., less gate driver signals or/and less source driver signals) and may use lower operating frequencies, and consequently reduce the power consumption related to the processes for generating the driving signals, as will be described in detail in later sections of this disclosure.

Figure 6B:
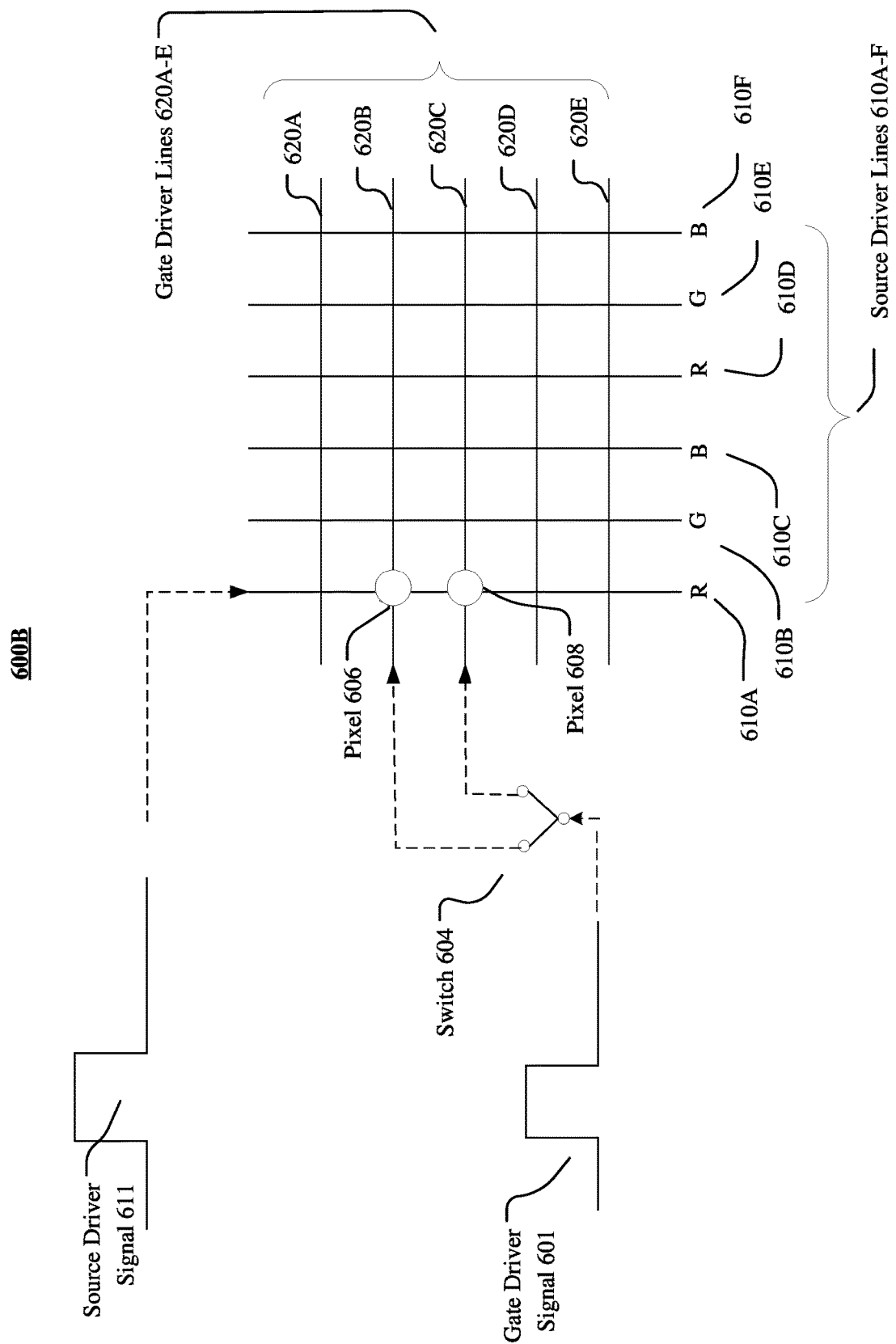
FIG. 6B illustrates an example scheme for displaying an image portion with a reduced resolution using shared gate driver signals.

FIG. 6B illustrates an example scheme 600B for displaying an image portion with a reduced resolution using shared gate driver signals (e.g., 601). In particular embodiments, the system may display an image portion with a high resolution (e.g., a full resolution of the display) in a display region corresponding to the foveal region or gazing point of the user and display image portions with reduced resolutions in other display regions. In the display regions with reduced resolutions, some neighboring pixels or adjacent pixels may share the same grayscale values, and therefore can be set to the same grayscale values using shared gate driver signals. As an example and not by way of limitation, the system may display an image portion with a reduced resolution (e.g., resolutions lower than the full resolution of the display) in a display region covering the matrix of pixels as illustrated in FIG. 6B. The pixels 606 and 608 may share the same grayscale value and can be set to the same grayscale value using the same gate driver signal 601 and source driver signal 611. The system may generate the source driver signal 611 with a desired pulse amplitude corresponding the target grayscale value of the pixels 606 and 608 and send the source driver signal 611 to the pixel column of 610A containing the pixels 606 and 608. Instead of sending a gate driver signal to each pixel rows of 620B and 620C, the system may send or route the gate driver signal 601 through a switch 604 (e.g., a transistor switch) to both pixels rows of 620B and 620C. The pixels 606 and 608 may be set to the corresponding grayscale value as determined by the pulse amplitude of the source driver signal 611 during the pulse period of the gate driver signal 601. As a result, the system may set the grayscale values of multiple pixels (e.g., 606 and 608) simultaneously during the same time period and using shared gate driver signals (e.g., 601) and source driver signals (e.g., 611). It is notable that the two pixels sharing the same grayscale value are for example purpose only and the pixels sharing the same grayscale value are not limited thereof. The number of pixels that share the same grayscale value could be any suitable integer number (e.g., 2, 3, 4, 5, 6, 10, etc.). For example, the gate driver signal 601 may be fed, through a transistor switch, to any number of pixel rows containing pixels having the same grayscale value to set those pixels' grayscale values simultaneously. By feeding the same gate driver signal to multiple pixel rows, the system may reduce the number of gate driver signals that are needed for displaying foveated images, and therefore reduce the power consumption.

Figure 6C:
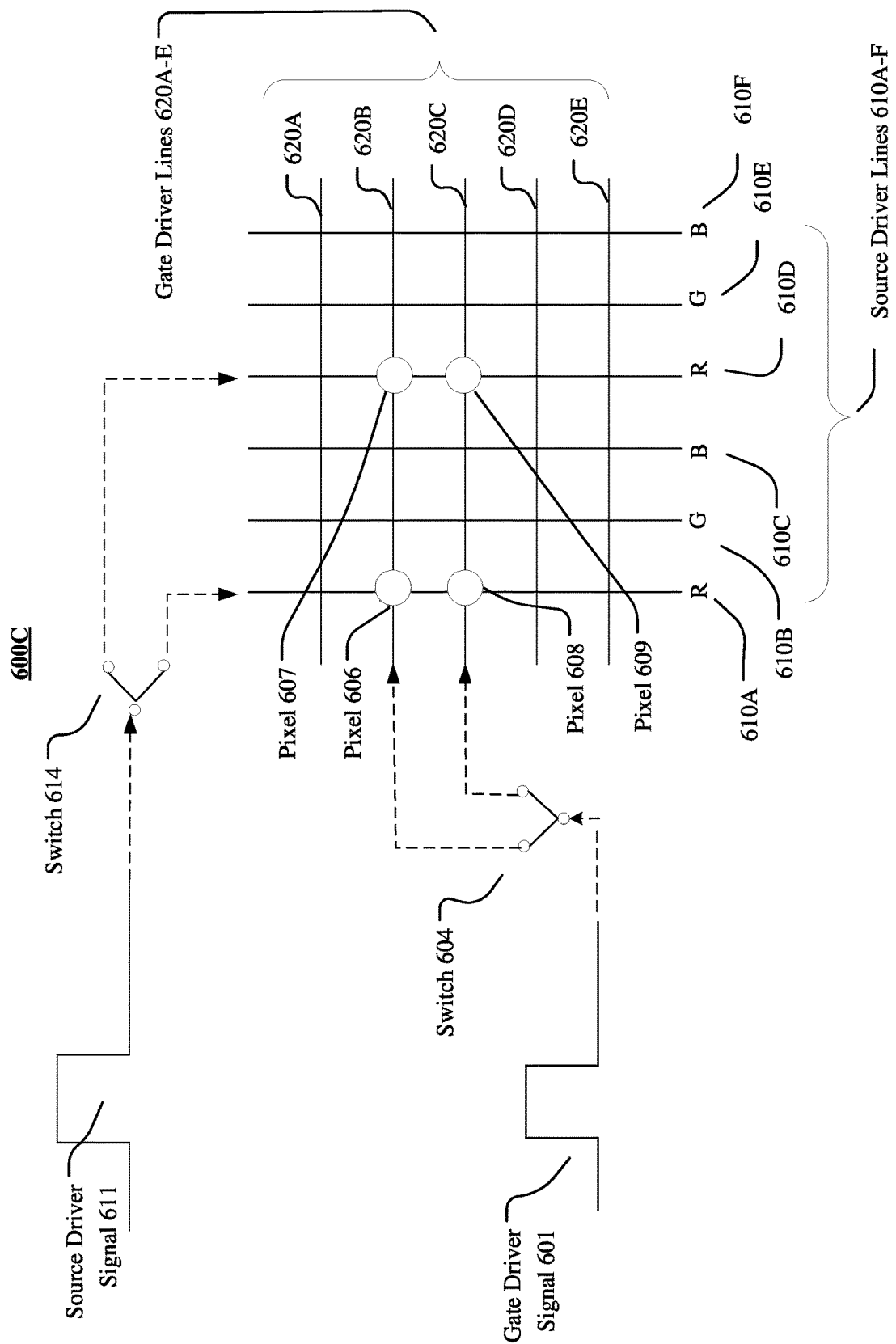
FIG. 6C illustrates an example scheme for displaying an image portion with a reduced resolution using shared source driver signals and shared gate driver signals.

FIG. 6C illustrates an example scheme 600C for display an image portion with a reduced resolution using shared source driver signals (e.g., 614) and shared gate driver signals (e.g., 601). In particular embodiments, the system may display image portions with reduced resolutions in one or more display regions of the display. Some neighboring pixels or adjacent pixels in these regions may share the same grayscale values. As an example and not by way of limitation, the system may display an image portion with a reduced resolution (e.g., resolutions lower than the full resolution of the display) in a display region covering the matrix of pixels as illustrated in FIG. 6C. The neighboring pixels 606, 607, 608, and 609 may share the same grayscale value. It is notable that even though the pixels 606 and 607 (and the pixels 608 and 609) may not be physically next to each other, they may be conceptually considered as neighboring pixels because they are the next pixel of the same color channel to each other. The system may generate the source driver signal 611 with a desired pulse amplitude corresponding the target grayscale value of the pixels 606, 607, 608, and 609 and route the source driver signal 611 to the pixel columns of 610A and 610D through a transistor switch 614. The system may send the gate driver signal 601 through the transistor switch 604 to both pixels rows of 620B and 620C. The pixels 606, 607, 608, and 609 may be set to the corresponding grayscale value as determined by the pulse amplitude of the source driver signal 611 during the pulse period of the gate driver signal 601. As a result, the system may set the grayscale values of multiple pixels (e.g., 606, 607, 608, and 609) simultaneously during the same time period using shared gate driver signals (e.g., 601) and shared source driver signals (e.g., 611). It is notable that the four pixels sharing the same grayscale value are for example purpose only and the pixels sharing the same grayscale value are not limited thereof. The number of pixels that share the same grayscale value could be any suitable integer number. The source driver signal 611 may be fed, through a transistor switch, to any number of pixel columns containing pixels sharing the same grayscale value to set those pixels' grayscale values simultaneously. By feeding the same source driver signal to multiple pixel columns or/and by feeding the same gate driver signal to multiple pixel rows, the system may reduce the number of source driver signals that are needed for displaying foveated images, and therefore reduces the power consumption of the AR/VR systems.

Figure 6D:
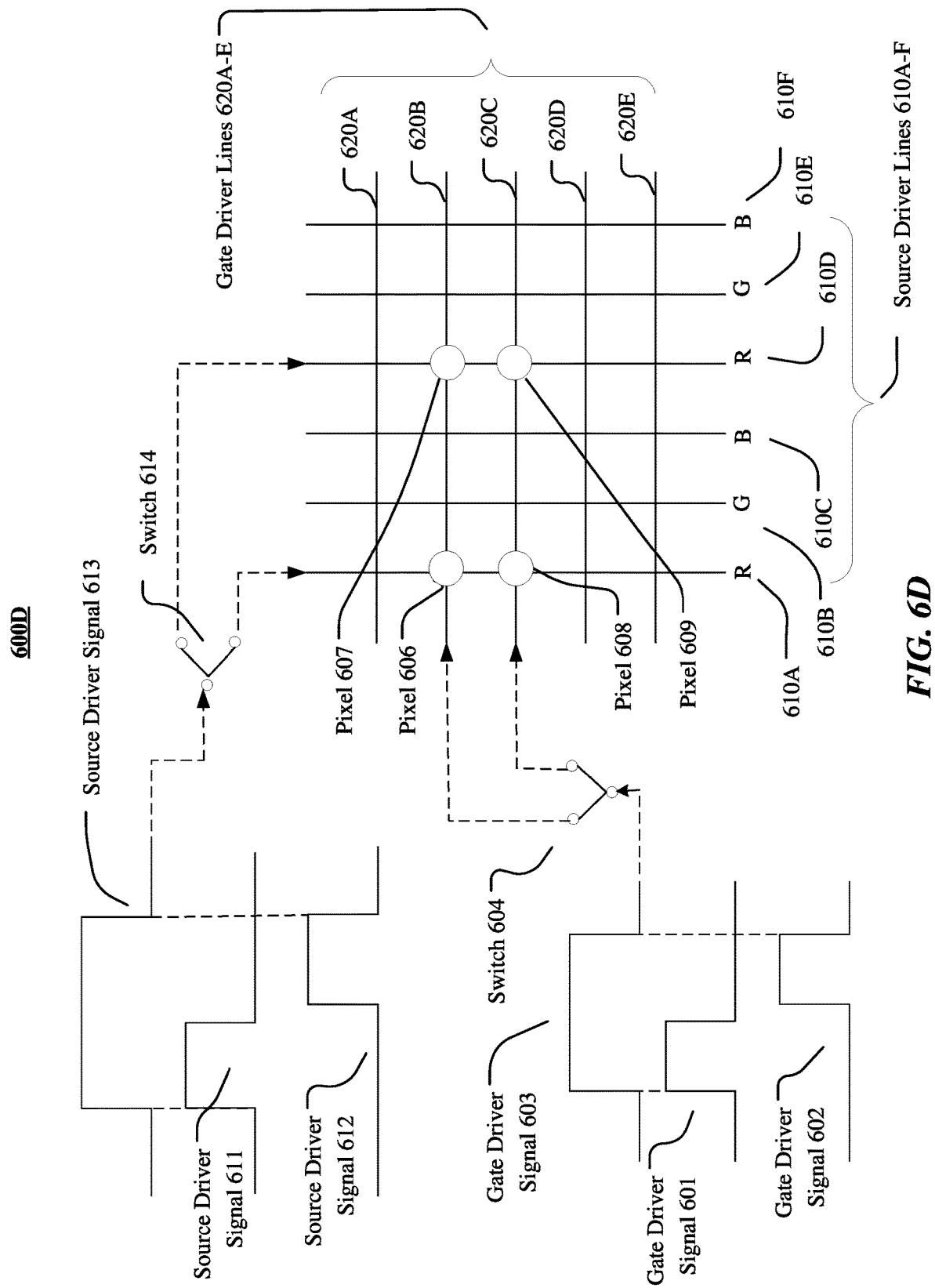
FIG. 6D illustrates an example scheme for display an image portion with a reduced resolution using shared source driver signals and shared gate driver signals with reduced operating frequencies.

FIG. 6D illustrates an example scheme 600D for display an image portion with a reduced resolution using shared source driver signals (e.g., 614) and shared gate driver signals (e.g., 601) with reduced operating frequencies. In particular embodiments, the gate driver signals and source driver signals that are shared by multiple pixel rows or columns may have longer pulse periods or time durations, smaller number of pulses, and lower operating frequencies than the corresponding driver signals for full resolution displaying. As an example and not by way of limitation, the system may generate a gate driver signal 603 which may have longer pulse durations than the gate driver signals for full resolution displaying (e.g., 601, 602). For example, the pulse duration of the gate driver signal 603 may correspond to the time duration of two or more pulses of the gate driver signals for full resolution displaying. It is notable that the pulse duration of the gate driver signal 603 is for example purpose only and the pulse duration of shared gate driver signals is not limited thereof. The pulse duration of any gate driver signals could have any suitable lengths. Similarly, the system may generate a source driver signal 613 which may have longer pulse durations than the source driver signals for full resolution displaying (e.g., 601, 602). For example, the pulse duration of the source driver signal 613 may correspond to the time duration of two or more pulses of the source driver signals for full resolution displaying. It is notable that the pulse duration of the source driver signal 603 is for example purpose only and the pulse duration of shared gate driver signals is not limited thereof. The pulse duration of any source driver signals could have any suitable lengths.

It is notable that, to set the grayscale values of multiple pixels using shared gate driver signals or/and shared source driver signals, these signals may not need to have longer pulse durations. For example, the gate driver signals and source driver signals generated for full resolution displaying (e.g., by feeding a gate driver signal to each pixel row and feeding a source driver signal to each column) may be directly fed (e.g., through corresponding transistor switches) to multiple pixel rows and multiple pixel columns to simultaneously set the grayscale values of multiple pixels. However, having longer time periods for the pulses may allow the driver signals to operate at lower frequencies and reduce the power consumption for generating these driver signals. For a given frame rate or speed, the system may set the grayscale values of the pixels using longer pulse durations and without slowing down the frame rate by setting the grayscale values of multiple pixels simultaneously. Therefore, the system may display the images with the same frame rate using longer pulse durations and lower signal frequencies. When a gate driver signal is fed to N pixel rows, the gate driver signal may have N times longer pulse durations and therefore reduce the frequency to 1/N. For example, if a gate driver signal is fed to two rows of pixels, the gate driver signal may have twice longer pulse durations and therefore reduce the frequency to half. As another example, if a gate driver signal is fed to three rows of pixels, the gate driver signal may have thrice longer pulse durations and therefore reduce the frequency to one-third. Similarly, when a source driver signal is fed to N pixel columns, the source driver signal may have N times longer pulse durations and therefore reduce the frequency to 1/N. For example, when a source driver signal is fed to two columns of pixels, the source driver signal may have twice longer pulse durations and therefore reduce the frequency to half. As another example, if a source driver signal is fed to three columns of pixels, the source driver signal may have thrice longer pulse durations and therefore reduce the frequency to one-third. By using the shared gate driver signals or/and shared source driver signals for displaying foveated images, the system may simultaneously set the grayscale values of multiple pixels using the shared driver signals with lower signal frequency (and therefore smaller number of pulses per time unit), and therefore reduce the power consumption of the AR/VR systems.

Figure 7:
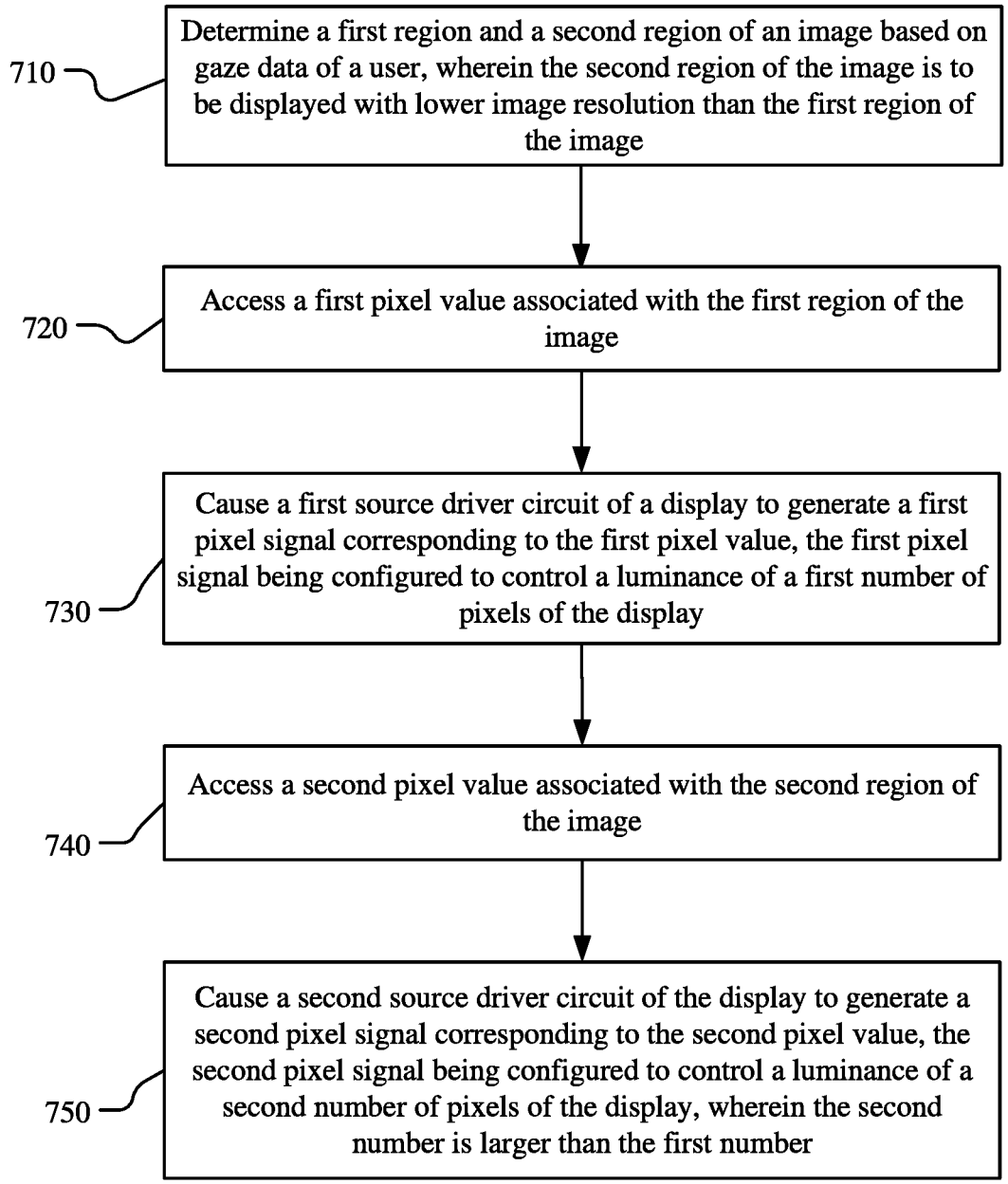
FIG. 7 illustrates an example method for displaying a foveated image.

FIG. 7 illustrates an example method 700 for displaying a foveated image. The method 700 may begin at step 710, where the computing system may determine a first region and a second region of an image based on gaze data of a user. The second region of the image may be displayed with lower image resolution than the first region of the image. In particular embodiments, the gaze data may include a gazing point of the user as determined by one or more embedded sensor of the display. In particular embodiments, the one or more embedded sensors may be embedded in the display at one or more transparent areas or one or more open areas of the display. In particular embodiments, the first region of the image may correspond to a first display region encompassing the gazing point of the user. The second region of the image may correspond to a second display region excluding the first display region. At step 720, the system may access a first pixel value associated with the first region of the image. At step 730, the system may cause a first source driver circuit of a display to generate a first pixel signal corresponding to the first pixel value. The first pixel signal may be configured to control a luminance of a first number of pixels of the display. At step 740, the system may access a second pixel value associated with the second region of the image. At step 750, the system may cause a second source driver circuit of the display to generate a second pixel signal corresponding to the second pixel value. The second pixel signal may be configured to control a luminance of a second number of pixels of the display. The second number may be larger than the first number.

In particular embodiments, the first number of pixels may be within the first display region encompassing the gazing point of the user and the second number of pixels of the display may be within the second display region excluding the first display region. In particular embodiments, the second number pixels of the display may include pixels from two or more pixel columns associated with a color channel. The second pixel signal may be routed to the two or more pixel columns through a switch. In particular embodiments, the first pixel signal and the second pixel signal may have respective signal amplitudes corresponding to the first pixel value and the second pixel value. In particular embodiments, the second pixel signal may have a longer pulse duration than the first pixel signal. In particular embodiments, the system may cause a first gate driver circuit of the display to generate a first clock signal. The first clock signal may be configured to control the luminance of the first number of pixels of the display. The system may cause a second gate driver circuit of the display to generate a second clock signal. The second clock signal may be configured to control the luminance of the second number of pixels of the display. In particular embodiments, the second number of pixels may include pixels from two or more of pixel rows. The second clock signal may be routed to the two or more pixel rows through a switch. The second clock signal may have a longer pulse duration the first clock signal.

Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for displaying a foveated image including the particular steps of the method of FIG. 7, this disclosure contemplates any suitable method for displaying a foveated image including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
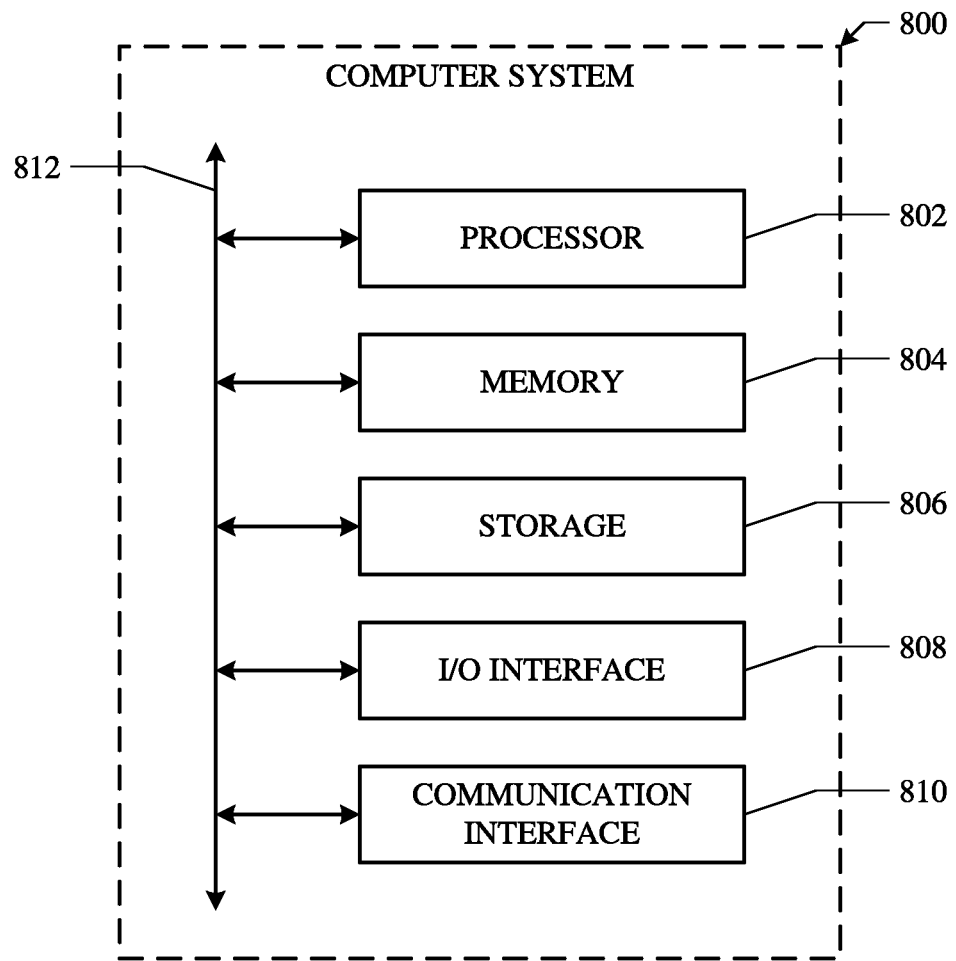
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
   determining a first region and a second region of an image based on gaze data of a user, wherein the second region of the image is to be displayed with lower image resolution than the first region of the image;
   accessing a first pixel value associated with the first region of the image;
   causing a first gate driver circuit of a display to generate a first clock signal for the first pixel value, the first clock signal being configured to control a luminance of a first number of pixels of the display;
   accessing a second pixel value associated with the second region of the image; and
   causing a second gate driver circuit of the display to generate a second clock signal for the second pixel value, the second clock signal being configured to control a luminance of a second number of pixels of the display, wherein the second number is larger than the first number, and wherein the second clock signal comprises a longer pulse duration than the first clock signal.

2. The method of claim 1, wherein the gaze data comprises a gazing point of the user, wherein the first region of the image corresponds to a first display region encompassing the gazing point of the user, and wherein the second region of the image corresponds to a second display region excluding the first display region.

3. The method of claim 2, wherein the first number of pixels of the display are within the first display region, and wherein the second number of pixels of the display are within the second display region.

4. The method of claim 2, wherein the gazing point of the user is determined based on one or more sensors embedded in the display, and wherein one or more of the sensors are embedded in the display at one or more transparent areas of the display.

5. The method of claim 1, further comprising:
causing a first source driver circuit of the display to generate a first pixel signal corresponding to the first pixel value, the first pixel signal being configured to control the luminance of the first number of pixels of the display; and
causing a second source driver circuit of the display to generate a second pixel signal corresponding to the second pixel value, the second pixel signal being configured to control the luminance of the second number of pixels of the display, wherein the first pixel signal and the second pixel signal comprise respective signal amplitudes corresponding to the first pixel value and the second pixel value.

6. The method of claim 5, wherein the second number of pixels comprise pixels from two or more pixel columns associated with a color channel, and wherein the second pixel signal is routed to the two or more pixel columns through a switch.

7. The method of claim 5, wherein the second pixel signal comprises a longer pulse duration than the first pixel signal.

8. The method of claim 5, wherein the first pixel signal has a signal amplitude corresponding to the first pixel value.

9. The method of claim 5, wherein the second pixel signal has a signal amplitude corresponding to the second pixel value.

10. The method of claim 5, wherein the second number of pixels comprise pixels associated with one or more pixel rows, and wherein the second pixel signal is routed to the one or more pixel rows through a switch.

11. The method of claim 1, wherein the second number of pixels comprise pixels from two or more pixel rows, and wherein the second clock signal is routed to the two or more pixel rows through a switch.

12. The method of claim 1, wherein the first number of pixels of the display comprise one or more pixels.

13. The method of claim 1, wherein the first number of pixels of the display comprise two or more pixels.

14. The method of claim 1, wherein the second number of pixels comprise pixels associated with two or more pixel columns, and wherein the second clock signal is routed to the two or more pixel columns through a switch.

15. One or more computer-readable non-transitory storage media embodying software that is operable when executed to:
determine a first region and a second region of an image based on gaze data of a user, wherein the second region of the image is to be displayed with lower image resolution than the first region of the image;
access a first pixel value associated with the first region of the image;
cause a first gate driver circuit of a display to generate a first clock signal for the first pixel value, the first clock signal being configured to control a luminance of a first number of pixels of the display;
access a second pixel value associated with the second region of the image; and
cause a second gate driver circuit of the display to generate a second clock signal for the second pixel value, the second clock signal being configured to control a luminance of a second number of pixels of the display, wherein the second number is larger than the first number, and wherein the second clock signal comprises a longer pulse duration than the first clock signal.

16. The media of claim 15, wherein the gaze data comprises a gazing point of the user, wherein the first region of the image corresponds to a first display region encompassing the gazing point of the user, and wherein the second region of the image corresponds to a second display region excluding the first display region.

17. The media of claim 15, further embodying software that is operable when executed to:
cause a first source driver circuit of the display to generate a first pixel signal corresponding to the first pixel value, the first pixel signal being configured to control the luminance of the first number of pixels of the display; and
cause a second source driver circuit of the display to generate a second pixel signal corresponding to the second pixel value, the second pixel signal being configured to control the luminance of the second number of pixels of the display, wherein the second pixel signal comprises a longer pulse duration than the first pixel signal.

18. A system comprising:
one or more processors; and
one or more computer-readable non-transitory storage media coupled to one or more of the processors and comprising instructions operable when executed by one or more of the processors to cause the system to:
determine a first region and a second region of an image based on gaze data of a user, wherein the second region of the image is to be displayed with lower image resolution than the first region of the image;
access a first pixel value associated with the first region of the image;
cause a first gate driver circuit of a display to generate a first clock signal for the first pixel value, the first clock signal being configured to control a luminance of a first number of pixels of the display;
access a second pixel value associated with the second region of the image; and
cause a second gate driver circuit of the display to generate a second clock signal for the second pixel value, the second clock signal being configured to control a luminance of a second number of pixels of the display, wherein the second number is larger than the first number, and wherein the second clock signal comprises a longer pulse duration than the first clock signal.

19. The system of claim 18, wherein the gaze data comprises a gazing point of the user, wherein the first region of the image corresponds to a first display region encompassing the gazing point of the user, and wherein the second region of the image corresponds to a second display region excluding the first display region.

20. The system of claim 18, wherein the system is further configured to:
- cause a first source driver circuit of the display to generate a first pixel signal corresponding to the first pixel value, the first pixel signal being configured to control the luminance of the first number of pixels of the display; and
- cause a second source driver circuit of the display to generate a second pixel signal corresponding to the second pixel value, the second pixel signal being configured to control the luminance of the second number of pixels of the display, wherein the second pixel signal comprises a longer pulse duration than the first pixel signal.

\* \* \* \* \*